April 26, 1955

M. F. CHUBB 2,707,202

LEAD ACID STORAGE BATTERY CONSTRUCTION

Filed Jan. 26, 1952

INVENTOR.
Melvin F. Chubb.
BY
Wood, Herron & Evans
ATTORNEYS.

United States Patent Office

2,707,202
Patented Apr. 26, 1955

2,707,202

LEAD ACID STORAGE BATTERY CONSTRUCTION

Melvin F. Chubb, Joplin, Mo., assignor to The Eagle-Picher Company, Cincinnati, Ohio, a corporation of Ohio Application January 26, 1952, Serial No. 268,421

5 Claims. (Cl. 136—147)

This invention relates to lead acid storage batteries which are commonly used to operate the electrical systems of automobiles and for countless other purposes. In the past, batteries of this type have always worn out in a relatively limited length of time and, particularly, have been subject to sudden failure, often at a great inconvenience to the car owner. A statistical survey has indicated that the most frequent cause of battery failure has been fracture of the battery case itself, and the second most frequent cause of failure has been the shedding of the paste from the grid of the positive electrode, which usually causes the battery to short circuit even if there is some positive paste left on the grid. Such short circuiting is the end of the battery which must then be discarded.

The primary objective of the present invention is to provide a lead acid battery construction which avoids the short circuiting as a consequence of the shedding of the positive paste. The principle or expedient of the present invention may be used for this purpose alone or its use may be extended to provide a novel, structurally integral battery case and lead acid electrolytic cell. This further utilization of the invention not only obviates the short circuiting due to disintegration of the positive plate but provides a strong and reliable battery case which cannot be fractured or cracked and is less apt to fail than the battery cases heretofore employed. Further, this battery case tends to protect the pasted plates or electrodes from vibration and shock, thereby lessening the tendency of the plates to disintegrate physically.

Whether or not it is desirable to extend the use of the principle of the present invention beyond the obviation of short circuiting, that is, to include the improved battery as a whole is primarily a matter of economics, and depends upon the use to which the battery is to be put. This is because the present invention utilizes a small amount of relatively expensive plastic for preventing short circuiting and the use of enough to complete the battery is expensive in comparison with the cheap asphaltic plastics which are now in use for battery cases. The extra cost is warranted in all instances, however, where there is sufficient premium on dependability.

The principles and advantages of the present invention will be better understood in relation to the accompanying drawings in which.

Figure 1:
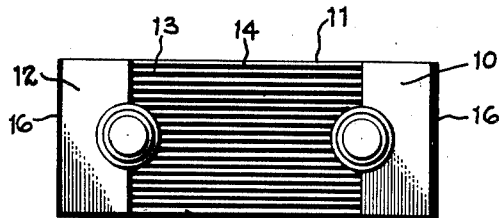
Figure 1 is a plan view of a set of electrodes for a single cell.

In the utilization of the invention, plastic electrode separators are employed which may be adhered to plastic compositions which are subject to being thermally set. Preferably, the separators are made the same width as the pasted grids and interleaved between them with the bottoms and side edges of the pasted grids and separators in substantial alignment. If desired, the separators may be made slightly wider than the electrodes, but the substantially flush side edges are believed to provide supplemental support for the electrodes and make for a compactness of structure which tends to reduce electrode shedding. Sheet material is then coated with plastic and the sheet material applied to or wrapped around the bottoms and side edges of the assembled electrodes and separators. When the plastic is set, it adheres to the exposed edges of the separators and penetrates between the separators and electrodes very slightly so that the electrode assembly is sealed on three edges. If paste sheds from the positive electrode, it is still confined by the edge-sealing between its grid and the two separators adjacent to the grid. The disintegration of the plate of the positive electrode may lessen the amperage of the battery to some degree but it is impossible for the cell to short circuit.

In contrast, the usual lead acid battery has a space below the electrodes, that is, between the bottoms of the electrodes and the battery. As the positive paste sheds from the grid, it works down into the bottom of the cell, and when enough accumulates the cell is short circuited by it. All lead acid batteries ultimately fail in this manner unless they fail for other reasons first.

Although the electrodes of lead acid batteries are quite heavy, this edge-sealing construction, when combined with additional and appropriate plastic sheeting, may be utilized to provide a complete battery case which houses a number of individual cells. Such an integral structure is fabricated simply by substituting resilient plastic sheeting to which the edge-sealing plastic adheres for the flexible wrapping used to seal the plate edges. In such case, the cell partitions are constituted by the same resilient plastic sheet material which is used for the side walls and bottom. If desired, the use of plastic wrapping sheets and plastic plates may be combined. The principle is the same, namely, the use of plastic sheet material of selected flexibility or strength as a means of supplying adhesive cement to bond the edges of the electrode separators and, if desired, to other necessary structural parts of a complete battery. Many plastics are available which are not subject to fracture, and utilization of such plastics is particularly recommended where durability is desired.

In the drawings (Figures 1 and 2), a conventional electrode holder 10 connects a plurality of positive electrodes 11 and an electrode holder 12 electrically connects a plurality of negative electrodes 13. The positive and negative electrodes are arranged face to face to constitute a pile or stack. Each electrode is constituted by the conventional lead grid (not specifically shown) filled with the paste (not shown) which is appropriate for the character of the electrode. The electrode holders 10 and 12 may also support the electrodes physically to some extent as well as connecting them electrically and this, too, is conventional.

Between each positive plate and its adjacent negative plate, an electrode separator 14 is disposed. The size of the electrode separator is preferably such that the side and bottom edges of the electrodes and the separators terminate in the same bottom and side planes, whereby the positive electrodes, the negative electrodes and the separators constitute a pile or stack having relatively smooth or even sides and bottom. The separators preferably extend up above the tops of the grid to prevent short circuiting through the electrolyte of the cell which is above the pasted grids. Also, the top edges of the electrodes are preferably coated with a protective layer 17 such as may be deposited from a coating of chlorinated rubber dissolved in volatile solvent. Such a thin protective layer prevents physical and/or chemical build up of products on the top edges of the electrodes and prevents possibility of short circuiting between such build up and the exposed lead of the electrode holders.

About the bottom and side edges of the stack, a plastic 16 is disposed which adheres to the electrode separators so that the electrode separators and the plastic constitute an integral physical structure and each electrode of the cell except for the end electrodes is disposed in a pocket constituted by separators at each face of the electrode and the plastic which joins the separators about the sides and bottom of the electrode. Very few plastics, if any, bond firmly to lead grids, but, nevertheless, the plastic sets about the bottom and sides of the lead grids and adheres to at least some degree.

Preferably, the plastic is applied to the bottom and sides of the stack by means of the technique which comprises applying plastic cement to a flexible sheet of material to form a coating of anywhere from 1/32 to 1/4 of an inch in thickness. The flexible sheeting is then wrapped around the bottom and side edges of the stack after which the plastic is thermally set and thus joined or bonded to the electrode separators.

The set of electrodes so constituted may then be inserted in a cell compartment of the conventional molded battery case. In use, the battery does not deteriorate in the manner of the conventional storage battery. In the first place, the electrodes are pocketed by the separators and plastic to minimize the ill effects of jar and vibration. In the second place, even if one of the electrodes does disintegrate by shedding paste, the paste is confined in the pocket or compartment in which the electrode is housed. The paste, therefore, cannot work down to the bottom of the battery and short circuit the cell as happens in the conventional lead acid battery. While the electrolytic value of the disintegrated paste may be lessened, still it remains in the same pocket with the grid on which it was originally pasted so that its value as an active material, while impaired, is not totally lost and above all, the battery does not suddenly go completely dead without warning.

Figure 3:
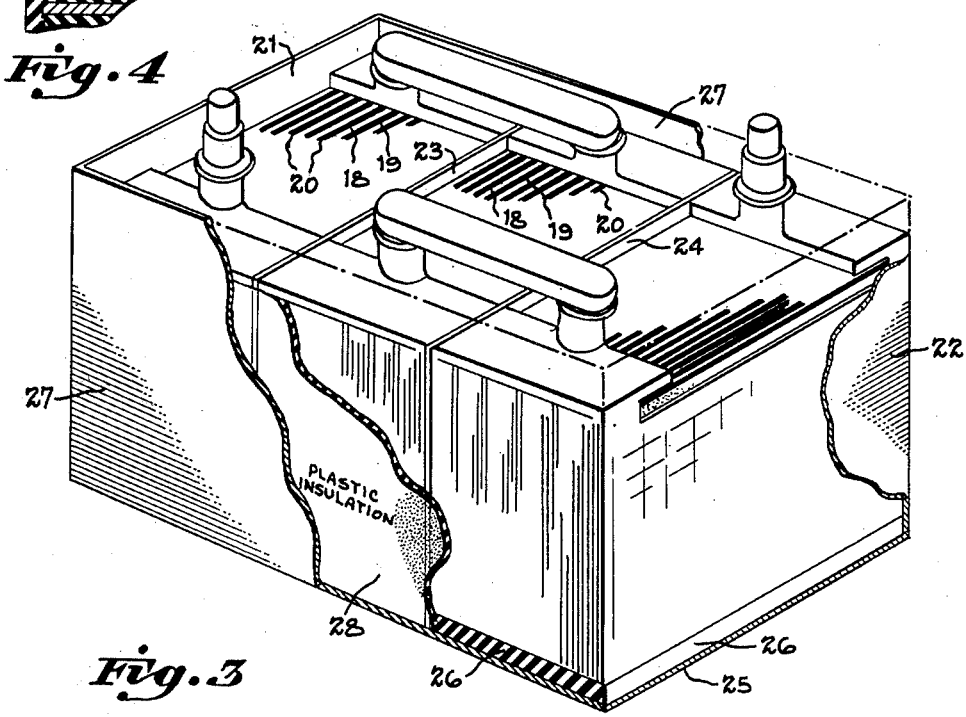
Figure 3 is a perspective view, shown partly in section, of a complete integral battery which utilizes the substance of the present invention fully.

As indicated, Figure 3 discloses a battery wherein the previously described technique is utilized to build the battery case about the electrodes. Figure 3 shows a conventional storage battery having this type of construction. In this view, three stacks of positive electrodes 18, negative electrodes 19 and electrode separators 20 are assembled and the battery case built around them. As disclosed, two end plates, 21 and 22, and two cell partitions, 23 and 24, are assembled with the three stacks of electrodes to provide a three-cell battery with each individual stack of electrodes housed in a separate cell compartment. In other words, the three stacks of electrodes and electrode separators are assembled with their sides and bottom edges aligned, an end plate is applied to each end of the stack and a cell partition is applied between the middle cell electrodes and those of each end cell. Preferably, these end plates and cell partitions are slightly larger than the electrodes and separators in facial area, the end plates and cell separators extending above the other members of the stack to contain free electrolyte above the electrodes of each cell. The sides of the end plates and cell partitions, however, are substantially flush with the sides of the electrodes and separators. As shown in Figure 3, the bottoms of the end plates and cell partitions extend slightly below the bottoms of the electrodes and cell separators for reasons which will be further explained. These end plates and cell separators may be relatively thin resilient plastic sheet material having whatever strength may be considered proper for the environment in which the battery is to be used.

Figure 2:
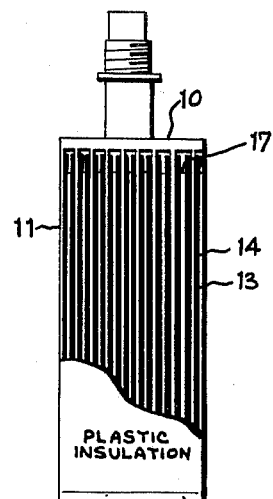
Figure 2 is an end view of the electrodes in Figure 1.
Figure 4:
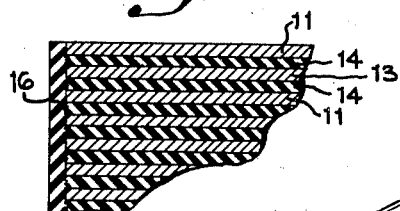
Figure 4 is a fragmentary cross sectional view, taken on a horizontal plane, through one of the corners of the cell of Figure 1.

The end plates, cell partitions and electrode separators are then bonded together by means of a thermally setting plastic cement as set forth in the description of Figures 1 and 2 or, alternatively, as shown in Figure 3, a bottom plate 25 is coated with plastic cement 26 and the three stacks of electrodes including separators, cell partitions and end plates are assembled in position on said bottom plate. The thickness of the layer of the plastic cement on the bottom plate may be adjusted to increase the strength of the bottom and its cushioning effect, to whatever extent is desired. This layer as shown in Figure 3 is relatively thick. The bottom plate may be any plastic material to which the cement adheres. Side plates 27 may be applied in the same manner but the layers of adhesive cement 28 may be made relatively thin. The plastic is then thermally set and the battery is complete except for the top (not shown) which may be of any desired construction.

In this way the bottom, side plates, end plates, cell partitions and electrode separators are combined into an integral battery structure in which the individual cells are insulated from each other and in which each individual electrode plate is pocketed in a plastic structure so that any paste which the grid sheds is confined to the pocket.

Any system of compatible plastics may be used for the bottom, side plates, end plates, cell partitions and electrode separators. By this I mean that the plastic cement must adhere to all of these elements. Preferably, I employ plastics which are compatible with a vinyl plastic cement, that is, a cement constituted by copolymer of vinyl chloride and vinyl acetate appropriately plasticized with a non-volatile plasticizer such as dibutyl phthalate. Preferably, the plastic cement is of the type which may be thermally set to provide a tough, gumlike consistency and provide a semi-rigid resilient casing which cannot be fractured by ordinary blows. In other words, the thermally set vinyl cement forms a relatively elastic structure which, within limits, can be bent without breaking. The electrode grids are, in effect, adhesively bound together by the adhesive cement so that the electrode grids collectively contribute inner rigidity or solidity to the integrated battery structure as a whole.

The bottom, side plates, end plates and cell partitions may be relatively thin sheet plastic material such as methyl methacrylate, chlorinated rubber or vinyl plastic, all of which bond with the copolymer type of cement when the latter is thermally set. The electrode separators may also be fabricated from vinyl plastics, appropriate vinyl plastic separators being now on the market. These structural materials may be thin enough to be resilient or flexible, in and of themselves, and hence, when utilized to house electrodes and electrolyte, these elements may provide a tough elastic battery case.

The battery disclosed in Figure 3 has all of the advantages of the electrodes disclosed in Figures 1 and 2 as far as strength and avoidance of short circuiting is concerned. The advantages of building the battery case around the cell electrodes and spacers over using the edge-sealed cells in a pre-molded case is that the integrally built case cannot be cracked by charging the battery too rapidly or by concussion or vibration which would be fatal to the conventional molded case. Further, the resilient case and the pocket construction for housing and supporting the individual electrodes between separators provides a structure which minimizes the plate disintegrating effects of vibration and shock. In other words, the edge sealing, as disclosed in Figures 1 and 2, with its attendant advantages may be used with inexpensive pre-molded battery cases or the use of the principle may be extended to provide the integrated battery of Figure 3.

In either case, the practice of the present invention produces a structurally integral packet of pockets, each pocket constituted by two sheets of porous, electrolyte permeable, plastic, electrode separator material having contiguous facial areas, with three contiguous edges bonded together by a layer of electrolyte impermeable plastic cement. This layer of plastic cement may be extended to provide a packet of any desired number of pockets, including end pockets having electrolyte impermeable end closures. And further, by appropriately increasing the thickness of the layer of bonding plastic cement, the bottom and side walls of the packet may be made self-sustaining and of sufficient rigidity to support the electrodes structurally, whereby the orthodox molded battery case may be omitted if desired.

From the point of view of constructing a battery, the present invention is related to the construction method disclosed in my co-pending applications, Serial No. 172,558, filed July 7, 1950, entitled "Electric Battery," and Serial No. 181,248, filed August 24, 1950, entitled "Method of Making Electric Batteries." The specific plastic cement and the cement applying sheeting disclosed in said applications may be used in the practice of the present invention. The present invention is also related to co-pending application, Serial No. 311,687, filed September 26, 1952, entitled "Method of Constructing a Battery," wherein a method of constructing a battery, irrespective of the nature of the electrodes, is disclosed and claimed.

Having described my invention, I claim:

1. An electrode assembly for a cell of a lead acid storage battery, said electrode assembly comprising a plurality of positive and negative pasted plates having substantially similar facial areas, said positive and negative plates alternately arranged with their bottoms and side edges in alignment, vinyl plastic electrode separators disposed between each two plates, the edges of said electrode separators extending to, but not substantially beyond, the bottoms and sides of the plates between which they are interposed, a layer of thermally set edge-sealing vinyl plastic disposed about the bottoms and side edges of said plates and separators, said plastic physically engaging the edges of said plates and permanently bonded to said separators to constitute a series of open-topped pockets about each plate other than the end plates, and means disposed at the tops of the plates for connecting the positive plates together and the negative plates together.

2. A lead acid storage battery constituted by a plurality of series connected cells, the electrode assembly for each cell comprising a plurality of positive and negative pasted plates having substantially similar facial areas, said positive and negative plates alternately arranged with their bottom and side edges in alignment, vinyl plastic electrode separators disposed between each two plates, the edges of said electrode separators extending to, but not substantially beyond, the bottoms and sides of the plates between which they are interposed, a layer of thermally set edge-sealing vinyl plastic disposed about the bottom and side edges of said plates and permanently bonded to said separators to constitute a series of open-topped pockets about each plate other than the end plates, means disposed at the tops of the plates for connecting the positive plates together and the negative plates together, said electrode assemblies disposed in alignment and separated from each other by plastic cell partitions physically bonded to the thermally set plastic to which the plate separators are physically bonded, means for closing the outer end walls of the end cells, and means for connecting the cells in series.

3. In a lead acid storage battery, a series of pockets adapted to contain a series of pasted grid electrodes of alternately opposite polarity, said series of pockets comprising a plurality of sheets of porous plastic material, each adapted to function as an electrode separator, said sheets having contiguous facial areas, a continuous film of electrolyte impermeable plastic cement bonded to three contiguous edges of each sheet to hold said edges of said sheets in alignment with one another, thus providing a structurally integral packet of open-topped pockets for containing pasted grid electrodes, the faces of each pocket being permeable in respect to electrolyte, and two cell closures constituted by sheets of plastic material which are electrolyte impermeable, each of said closures having three edges substantially aligned with the bonded edges of the electrode separators, and themselves bonded in fixed relationship to the separators by the film of plastic cement which bonds the separators, thus constituting end pockets to the packet, each end pocket having an electrolyte impermeable outer face.

4. In a lead acid storage battery, a series of pockets adapted to contain a series of pasted grid electrodes of alternately opposite polarity, said series of pockets comprising a plurality of sheets of porous plastic material, each adapted to function as an electrode separator, said sheets having contiguous facial areas, a continuous film of electrolyte impermeable plastic cement bonded to three contiguous edges of each sheet to hold said edges of said sheets in alignment with one another, thus providing a structurally integral packet of open-topped pockets for containing pasted grid electrodes, the faces of each pocket being permeable in respect to electrolyte, and two cell closures constituted by sheets of plastic material which are electrolyte impermeable, each of said closures having three edges substantially aligned with the bonded edges of the electrode separators, and themselves bonded in fixed relationship to the separators by the film of plastic cement which bonds the separators, thus constituting end pockets to the packet, each end pocket having an electrolyte impermeable outer face, the said continuous film of electrolyte impermeable plastic cement being of sufficient thickness to constitute a self-sufficient electrode supporting bottom and side wall structure for the cell.

5. The battery of claim 3 in which the electrode separators are vinyl plastic, the bonding cement is constituted by a thermally set plasticized vinyl resin, and the electrode impermeable sheets of plastic material are fabricated from plastic to which the vinyl cement bonds.

References Cited in the file of this patent

UNITED STATES PATENTS

| | | |
|---|---|---|
| 1,861,467 | Benner et al. | June 7, 1932 |
| 2,014,390 | Lunn | Sept. 17, 1935 |
| 2,184,373 | Adams | Dec. 26, 1939 |
| 2,256,105 | Shank | Sept. 16, 1941 |
| 2,381,140 | Proctor | Aug. 7, 1945 |
| 2,504,608 | White | Apr. 18, 1950 |
| 2,642,469 | Gary | June 16, 1953 |

FOREIGN PATENTS

| | | |
|---|---|---|
| 540,591 | Great Britain | Oct. 22, 1941 |